US012714165B2

(12) United States Patent
Feist et al.

(10) Patent No.: US 12,714,165 B2
(45) Date of Patent: Aug. 25, 2026

(54) BACKPACK FOR FALL PROTECTION

(71) Applicant: Minerva AS GmbH, Erding (DE)

(72) Inventors: Holger Feist, Munich (DE); Anne Schwarz, Munich (DE); Simon Scherer, Munich (DE)

(73) Assignee: Minerva AS GmbH, Erding (DE)

( * ) Notice: Subject to any disclaimer, the term of this patent is extended or adjusted under 35 U.S.C. 154(b) by 645 days.

(21) Appl. No.: 17/901,467

(22) Filed: Sep. 1, 2022

(65) Prior Publication Data

US 2023/0071017 A1 Mar. 9, 2023

(30) Foreign Application Priority Data

Sep. 3, 2021 (EP) ..................................... 21194918

(51) Int. Cl.

| | |
|---|---|
| ***A41D 13/05*** | (2006.01) |
| ***A45F 3/04*** | (2006.01) |
| ***A62B 33/00*** | (2006.01) |
| ***B63C 9/125*** | (2006.01) |

(52) U.S. Cl.

CPC ......... *A41D 13/0556* (2013.01); *A41D 13/05* (2013.01); *A45F 3/04* (2013.01); *A62B 33/00* (2013.01); *B63C 9/125* (2013.01)

(58) Field of Classification Search

CPC .... A41D 13/00; A41D 13/0556; A41D 13/05; B63C 9/00; B63C 9/125; B63C 9/15; B63C 9/18; A45F 3/00; A45F 3/04; A62B 17/00; A62B 37/00

USPC ............................ 441/80; 116/210, 209, 211

See application file for complete search history.

(56) References Cited

U.S. PATENT DOCUMENTS

| | | | | |
|---|---|---|---|---|
| 6,270,386 | B1 * | 8/2001 | Visocekas ............ | A41D 13/018 441/80 |
| 7,270,077 | B2 * | 9/2007 | Beck .................... | A63B 29/021 116/210 |
| 7,878,141 | B2 * | 2/2011 | Paynton ............... | A63B 29/021 116/210 |
| 11,083,277 | B2 * | 8/2021 | Sniffen ................... | A45F 3/005 |

(Continued)

FOREIGN PATENT DOCUMENTS

| | | |
|---|---|---|
| CN | 102835753 A | 12/2012 |
| CN | 105495961 A | 4/2016 |

(Continued)

OTHER PUBLICATIONS

European Search Report for European Application No. EP 21 194 918.5 dated Mar. 14, 2022 (6 pages).

(Continued)

*Primary Examiner* — Lars A Olson

(74) *Attorney, Agent, or Firm* — IQUARLES & BRADY LLP

(57) ABSTRACT

A backpack that includes an airbag and a release module that comprises a control unit and a gas cartridge. The backpack is configured such that the airbag, in a standby state, is deflated and stowed in a storage space of the backpack. The backpack is also configured such that the airbag is automatically inflated, in response to the control unit detecting a fall of a user of the backpack, by releasing gas from the gas cartridge into the airbag. The backpack is further configured such that the airbag, in an inflated state, protects a cervical spine and/or a chest region and/or shoulder region of the user.

16 Claims, 6 Drawing Sheets

(56) References Cited

U.S. PATENT DOCUMENTS

| | | | |
|---|---|---|---|
| 2007/0056500 | A1 | 3/2007 | Beck |
| 2024/0423551 | A1 | 12/2024 | Hart et al. |

FOREIGN PATENT DOCUMENTS

| | | | |
|---|---|---|---|
| CN | 105495981 | A | 4/2016 |
| DE | 102013213306 | A | 1/2015 |
| DE | 102016107144 | A | 10/2017 |
| DE | 102017120925 | B | 11/2018 |
| DE | 102018115193 | A | 1/2019 |
| EP | 2394704 | A1 | 12/2011 |
| EP | 2632283 | B1 | 1/2016 |
| EP | 3181195 | B1 | 6/2017 |
| EP | 2621297 | B1 | 8/2017 |
| EP | 3566888 | A1 | 11/2019 |
| EP | 3384792 | B1 | 2/2020 |
| EP | 3344347 | B1 | 7/2020 |
| EP | 3681605 | A1 | 7/2020 |
| EP | 3696422 | A1 | 8/2020 |
| EP | 3326476 | B1 | 9/2020 |
| EP | 3812011 | A1 | 4/2021 |
| EP | 3745894 | B1 | 8/2022 |
| WO | 00/32274 | A1 | 6/2000 |
| WO | 2009121213 | A1 | 10/2009 |
| WO | 2016176301 | A2 | 11/2016 |
| WO | 2019004917 | A1 | 1/2019 |
| WO | 2019004918 | A1 | 1/2019 |
| WO | 2019004919 | A1 | 1/2019 |
| WO | 2019004920 | A1 | 1/2019 |
| WO | 2020149785 | A1 | 7/2020 |
| WO | 2020206155 | A1 | 10/2020 |
| WO | 2020260059 | A1 | 12/2020 |
| WO | 2020260106 | A1 | 12/2020 |
| WO | 2021/089439 | A1 | 5/2021 |
| WO | 2021089585 | A1 | 5/2021 |
| WO | 2023025495 | A1 | 3/2023 |

OTHER PUBLICATIONS

European Patent Office, Communication Pursuant to Article 94(3) EPC, Application No. 21194918.5, Jan. 24, 2024, 5 pages.

* cited by examiner

BACKPACK FOR FALL PROTECTION

CROSS-REFERENCE TO RELATED APPLICATIONS

This application claims priority to European Patent Application No. EP 21 194 918.5, filed on Sep. 3, 2021, the contents of which is incorporated herein by reference in its entirety for all purposes.

FIELD OF THE INVENTION

The invention provides a backpack for fall protection comprising an airbag that, in an inflated state, protects the user wearing the backpack when the user falls, for example from a bike.

BACKGROUND

Protection against accidents, and in particular falls that occur when travelling by bike or during similar activities, has become increasingly important and concerns several body parts of the user. Helmets for protecting the head have been known for a long time.

However, compared to protecting the head, it may often be difficult to protect other areas of the body sufficiently without significantly impeding the user, particularly when it comes to activities that are part of the user's day-to-day behavior, which may particularly pertain to mobility, for example travelling to the workplace by bike or other similar activities that may require protection.

SUMMARY

It is an object of the present invention to increase a user's flexibility in terms of reliably protecting body parts other than the head.

This problem, among others, is solved by the subject matter of the independent claims. Preferred embodiments are laid down in the dependent claims.

GENERAL DESCRIPTION

The invention provides a backpack for fall protection comprising an airbag and a release module, which comprises a control unit and a gas cartridge. The backpack is configured such that the airbag, in a standby state, is deflated and stowed in a storage space of the backpack. The backpack is also configured such that the airbag is automatically inflated, in response to the control unit detecting a fall of a user of the backpack, by releasing gas from the gas cartridge into the airbag. The backpack is further configured such that the airbag, in an inflated state, protects a cervical spine and/or a chest region and/or shoulder region, particularly including a collarbone, of the user.

The airbag may, in particular, be removably stowed in the backpack. The storage space may also be referred to as airbag compartment or airbag pocket.

The release module may comprise a sensor unit comprising one or more sensors, in particular, an acceleration sensor and/or a gyroscope and/or a magnetometer and/or barometer, and the control unit may be configured to receive sensor data from the sensor unit and, based on the sensor data, detect the fall of the user.

The advantage of the claimed backpack is that it may provide reliable protection for different regions of the user's body other than the head region, in particular of the shoulder region, the breast region, or the cervical spine region.

In the present disclosure, all position-related and orientation-related features, particularly specifying upper or lower parts, refer to an assembled state of the backpack and arrangement for the intended use of the backpack, particularly as worn by a user.

It is noted that the automatic inflation in response to detecting a fall of the user, in particular due to the use of the gas cartridge, allows for a sufficiently fast response of the airbag when an accident occurs. A manual release of the airbag, in accident situations, will not be fast enough to provide protection of the user. Drawing air from the surroundings, rather than using gas from the gas cartridge for inflation will also generally not be fast enough.

The airbag, as compared to protector plates or other conventional protectors, provides reliable protection of different body parts without impeding a user. Moreover, it is advantageous to provide the airbag as part of a backpack compared to, for example, providing an airbag attached to the user as a separate entity, e.g. as a wearable or a piece of clothing, because a backpack will often already be part of the user's routine, thereby increasing the chances that the protection will actually be used. Moreover, the backpack will generally not be covered, thereby ensuring that inflation of the airbag will not be obstructed and that protection of the user is reliable at all times. Specifically, for example if the airbag were to be stowed in a vest or in a jacket, in case the user puts any other piece of clothing or a bag or backpack on top of the vest or jacket, the airbag will not inflate properly and will not provide sufficient protection for the user. This makes protection unreliable.

Thus, a user's flexibility in terms of reliably protecting body parts other than the head can be increased without impeding the user.

In the following, several aspects regarding the preferred embodiments of the backpack will be described in detail. It is noted that all these aspects contribute to the overall solution of allowing for the airbag to be stowed away in a backpack in such a manner that it can reliably be inflated in a timely manner when an accident occurs, more specifically be released from where it is stowed, be fully inflated, and take the shape that is required to provide the protection reliably and fast enough to protect the user upon falling.

The backpack may have a modular configuration. In particular, the airbag may be entirely removable from the remaining parts of the backpack. Alternatively or in addition the release module may be removable from the remaining parts of the backpack. Alternatively or in addition the gas cartridge may be detachably fixed to the other elements of the release module, particularly to the sensor unit and/or the control unit. The control unit and the sensor unit may be arranged as a block and the gas cartridge may be detachably fixed to the block.

The control unit detecting a fall of the user may be implemented in any known way. Fall protection detection has been used in the past, for example in the context of inflatable helmets. As these helmets detect very similar conditions, the skilled person would be able to adapt the detection algorithms used therein to detect a fall of the user wearing the backpack of the present invention.

The backpack may be configured such that the airbag is brought from the standby state to the inflated state within 0.5 seconds or less, in particular within 0.3 seconds or less, in particular within 0.2 seconds or less, in particular within 0.18 seconds or less, in particular within 0.17 seconds or less. This is referred to as the inflation time in this disclosure.

This ensures that the airbag can properly protect the user upon falling. If the airbag does not inflate in time, it may not cushion the fall enough to reliably avoid injury. It is noted that the inflated state refers to the state of complete inflation.

The time it takes for the airbag to be brought from the standby state to the inflated state depends, for example, on the volume of gas to be delivered into the airbag, on the time it takes for the gas to travel to the various regions of the airbag, and the time it takes for the airbag to extend to the outside of the storage space and inflate into a shape that protects the respective body regions of the user. The latter may, for example, be influenced by the manner the airbag is stowed and/or it may be influenced by how the storage space is configured and arranged and/or how it opens to release the airbag upon inflation. In addition, it may also be influenced by the configuration of the airbag, including, but not limited to the shape of the airbag and additional elements that may influence how the airbag changes shape during inflation. Moreover, the time it takes for the airbag to be brought into an inflated state may also depend on the release module, in particular, the gas cartridge and/or the fall detection performed by the control unit.

Accordingly, several of the features that are presented below may influence, particularly in a synergistic manner, how fast the airbag can be brought from the standby state to the inflated state and, accordingly, how reliable the protection is.

The above-mentioned inflation time excludes the time it takes to detect the fall and trigger release of gas into the airbag. As an example, the time it takes to detect the fall and to trigger release of gas into the airbag may be 0.1 seconds or less, in particular 0.05 seconds or less.

In some embodiments, the sum of the inflation time and the time it takes to detect the fall and trigger release of gas into the airbag may be 0.5 seconds or less, in particular 0.3 seconds or less, in particular 0.2 seconds or less.

The backpack may be configured such that, upon inflation, at least a first airbag portion of the airbag is released from the storage space, particularly while remaining fixed to the inside of the storage space. The advantage of this is that the airbag, even in an inflated state, will be held in place by the remaining parts of the backpack, which in turn is affixed to the user at a relatively fixed position. Thus, proper protection by the airbag can be ensured by holding it in place even during the dynamic process of inflating the airbag and motion caused by the fall and impact of the user. This is particularly important in the context of the regions that are protected by the airbag because even minor deviations from the position where the airbag should be may lead to the protection being significantly less effective.

For example, the first airbag portion may be fixed to the inside of the storage space using a plurality of fixing means, which may, for example, be distributed along the length of a first storage portion of the storage space where the first airbag portion is stowed. The first fixing means may comprise buttons and/or toggles and/or velcro fasteners (also known as hook-and-loop fasteners) and/or hooks and/or loops configured to cooperate with buttons and/or toggles and/or button holes configured to cooperate with buttons and/or toggles. The airbag may have a plurality of second fixing means configured to cooperate with the first fixing means so as to fix the first airbag portion to the inside of the storage space.

Using such fixing means allows for a simple and quick assembly and disassembly of the backpack while at the same time ensuring that the airbag will remain in place upon inflation.

The storage space may have an opening through which the first airbag portion extends upon inflation and the backpack may comprise closing means, for example a zipper, a velcro fastener, and/or snaps. The opening may be at least partially, particularly completely, closed by means of the closing means when the airbag is in the standby state.

The closing means may be configured such that the closing means is opened by the airbag pressing against the closing means upon inflation. In particular, the closing means may be a zipper that runs along the opening, particularly along the entire length of the opening, and has at least one, in particular exactly one, burst section, wherein the burst section is arranged at a top of the backpack, centered between shoulder straps of the backpack, in particular vertically above the release module.

This allows for fast and reliable opening of the zipper upon inflation. The flow of gas in the airbag is more turbulent in other sections, such that the pressure at a differently located burst section may not reliably suffice to ensure that the zipper opens in a timely manner.

As mentioned above, the zipper may extend along the entire length of the opening. Using only one zipper that extends along the entire length of the opening reduces the potential failure points regarding opening of the zipper and also allows for smooth and complete opening so as to release the airbag in a reliable manner. However, there may also be more than one burst section. The zipper may, in particular, be a coil zipper, a QuickBurst® zipper or a Vision® zipper.

The burst section or each burst section may be covered by means of a piece of cover material. This piece of cover material may be releasably fixed to the outside of the backpack. For example, the piece of cover material may be in the form of a flap that is held closed by means of a velcro fastener in an arrangement so as to cover the burst section. This is a protection mechanism that allows for avoiding tampering or inadvertent opening of the burst section.

The backpack may be configured such that, in a standby state, at least part of the first airbag portion is stowed in the storage space within shoulder straps of the backpack.

Arranging part of the airbag in the shoulder straps allows for at least a portion of the airbag that protects the chest region of the user, and potentially also the shoulder region of the user, to be in physical proximity to the region it serves to protect in an inflated state. Accordingly, in case of an accident, it can be ensured that it will quickly protect the user, for example by wrapping around the chest of the user starting from the shoulder straps. Accordingly, the protection is particularly reliable.

The opening of the storage space may be configured to run along the respective edge, particularly an outer edge, of each of the shoulder straps and, optionally, the opening may further be configured to extend from the respective outer edge of each shoulder strap over the front of the shoulder strap towards the inner edge of the shoulder strap at the respective lower end of the opening within the respective shoulder strap.

The opening running along the edge of the shoulder straps allows for the airbag to reliably extend through the opening upon inflation. In particular, when the opening is configured to extend from the respective outer edge of each shoulder strap over the front of the shoulder strap towards the inner edge of the shoulder strap at the lower end of the opening within the respective shoulder strap, this allows for the portion of the shoulder strap that covers the airbag in a deflated state to be pushed away by the airbag upon inflation in a flap-like manner. Thus, release of the airbag from the opening is particularly reliable and fast.

Arrangement of the opening on the outer edge of the shoulder straps facilitates the inflation of the airbag, thereby increasing reliability of the protection of the breast region. The outer edge is also referred to as the outer binding of the shoulder straps. Alternatively, the opening may run along a respective inner edge or inner binding of the shoulder straps.

The part of the first airbag portion that is stored in each of the shoulder straps may be configured to, in an inflated state protect at least the breast region of the user. The storage space and/or the airbag, in the standby state, may be configured to extend at least to the position of the shoulder straps where the chest strap meets the shoulder straps. The storage space and/or the airbag, in the standby state, may be configured to extend up to the upper end of the shoulder straps.

The storage space may be arranged such that, in a standby state, the at least part of the first airbag portion is arranged on top of the lining of the shoulder straps and covered by the upper material of the shoulder straps. In particular, when the airbag is an inflated state, the inner edge of the upper material may remain fixed and the outer edge of the upper material may be released and folded back in a flap like manner by the inflating airbag.

One or both of the shoulder straps may have a portion shaped to guide the airbag's movement upon inflation, for example a flap-shaped portion. Thus inflation of the airbag in the chest area may be improved.

The backpack may be configured such that the position of the chest strap along the length of the shoulder straps is adjustable. For example, the chest strap may be positionable by means of a daisy chain system. The daisy chain system may be combined with a configuration of the backpack wherein a cable runs from the release module through the storage portion within the shoulder straps to a buckle of the chest strap, e.g. the cable and buckle described in more detail below. The daisy chain system is an easy to produce and use system that does not interfere with guiding the cable and does not endanger reliability of the electrical connection.

The release module may comprise a sensor unit comprising one or more sensors, for example an acceleration sensor and/or a gyroscope and/or a magnetometer and/or a barometer, and the control unit may be configured to receive sensor data from the sensor unit and, based on the sensor data, detect of all the fall of the user. As mentioned above, algorithms for fall detection based on sensor data are generally known and the skilled person would be able to suitably adopt a suitable algorithm in this context.

The sensor unit, and optionally the control unit, may be attached to the gas cartridge with a fixed orientation. Keeping the sensor unit in a fixed orientation relative to the main body of the backpack is advantageous for proper fall detection and, as the gas cartridge also has to be fixed with proper orientation, it can be advantageous to attach gas cartridge and sensor unit with a fixed orientation.

The release module may be arranged inside the main compartment of the backpack, particularly adjacent to a back panel of the main compartment of the backpack. This is advantageous because it can be easily accessed and assembled and stabilized properly.

The release module may be removably stowed in an inner compartment inside of the main compartment of the backpack, the inner compartment being attached to a panel of the main compartment, particularly to the back panel, and/or being delimited, at least on one side, by a panel of the main compartment, particularly the back panel.

It is noted that the term "panel" is to be understood broadly, i.e., as the wall of the main compartment. The back panel is the wall that is closest to the user in intended use of the backpack.

The backpack may be configured such that a part of the airbag, i.e., a second airbag portion, extends into the main compartment of the backpack to connect to the gas cartridge, in particular, such that a part of the airbag extends into the inner compartment of the backpack.

In other words, the inner compartment may be a second storage portion of the storage space, the second storage portion being physically connected with the first storage portion, and the airbag, in a standby state, may be arranged so as to extend from the first storage portion into the second storage portion.

The backpack may particularly be configured such that the second airbag portion of the airbag is stowed in the inner compartment together with the release module. In particular, the airbag may be arranged between the panel, in particular the back panel of the main compartment and the release module.

More specifically, in this arrangement, the airbag in the inner compartment may be arranged adjacent to the back panel of the main compartment.

The inner compartment may be closed off from the main compartment by closing means, for example a zipper and/or a velcro fastener, which, for example, may fastens a fabric panel that covers the release module.

The backpack may comprise retaining means, for example a sleeve, arranged inside the inner compartment and configured to retain the release module in particular, so as to hold the gas cartridge in an upright orientation and/or limit an upward motion of the release module, particularly of the gas cartridge. The retaining means may also be seen as holding means and/or stabilizing means.

In the standby state, the airbag may be stowed in the storage space in such a manner that at least part of the airbag, particularly of the first airbag portion mentioned above, is in a folded state, particularly in a fan-shaped folding.

More specifically, at least a part of the airbag, particularly at least a part of the first airbag portion, that is stowed in the storage space within shoulder straps of the backpack, may be in the folded state in the standby state.

The airbag may be configured to have markings, particularly stitches, on its surface, indicating the target position of the folds. This allows for fast and reliable preparation of the airbag for stowing it in the storage space. When the airbag is not reliably prepared and inserted into the storage space, this may prolong the time until the airbag is fully inflated, thereby increasing the response time of the airbag and decreasing the reliability of the protection of the user.

The airbag may be made from a double weave. For example, the double weave may comprise two plies of woven material, wherein the plies are interwoven at outer edges of the airbag. In particular, the airbag may comprise a plurality of interwoven sections arranged and configured so as to bend at least part of the airbag, particularly of the first airbag portion, into shape upon inflation of the airbag, particularly so as to wrap around a cervical spine region, for example a neck region, and/or the chest region and/or the shoulder region upon inflation. In terms of the material of the airbag and fabrication methods of the airbag, materials, systems, and methods known in the art for other airbag systems, particularly those related to fall protection, may be used.

If the airbag did not comprise the plurality of interwoven sections, inflating the airbag into a shape that more reliably protects the user may take longer or may be less reliable. Moreover, it may lead to sharp bends in the inflated airbag. In the area of sharp bends, there is no proper cushioning, such that the reliability of protection is decreased.

In other words, the interwoven sections provide target sections for the airbag to bend around.

The airbag may comprise interwoven sections that run in a vertical direction and/or interwoven sections that run in a horizontal direction, wherein depending on the direction in which the interwoven sections run, bending of the airbag in a horizontal or vertical direction is facilitated. In particular, the airbag may have several rows and columns of interwoven sections, thereby allowing for a gradual bend of the airbag in two directions to properly wrap around the user in an inflated state. As such, the reliability of the protection is increased. Particularly, the interwoven sections may be arranged such that multiple cushions are shaped in the inflated airbag.

The backpack may comprise a buckle of a chest strap and/or a buckle of a hip strap. The backpack may be configured such that the release module is activated when the buckle of the chest strap and/or the buckle of the hip strip is in a closed state and deactivated when the buckle of the chest strap and/or the buckle of the hip strap is in an opened state.

The release module need not be active at all times, for example, when the user is not wearing the backpack. There are several ways in which it is conceivable to activate or deactivate the release module. For example, a button may be used, the arrangement of which is relatively flexible. However, using an activation and deactivation based on whether or not a buckle is closed has the advantage that closing all the buckles when putting on a backpack is part of the movement that the user is used to making upon getting ready to use the backpack, such that the likelihood that the user will forget to activate the release module is reduced compared to when the user has to keep in mind to press a button each time they start using the backpack. Furthermore, upon taking off the backpack, the user cannot forget to deactivate the release module because they have to open the buckle to take off the backpack. Thereby, inadvertent inflation of the airbag can be reliably avoided.

Optionally, the backpack may also have a parking position 26 for at least one part of the buckle, such that, when the backpack is not in use, it can be avoided that the buckle closes inadvertently, thereby activating the release module inadvertently and potentially leading to unintentional inflation of the airbag.

The buckle of the chest strap and/or the buckle of the hip strap may be configured to detect whether it is in a closed state or in an opened state and to provide information indicating whether it is in a closed state or in an opened state to the release module via a data connection. In particular, in case the buckle of the chest strap provides the information, it may be configured to provide the information indicating whether it is in a closed state or in an opened state to the release module via a cable running from the release module to the buckle of the chest strap through the storage space.

Providing the information via cable, in general, has the advantage that it is relatively safe because it is not prone to hacking or accidental shielding or interference of a wireless connection.

However, when using a cable, there is always a risk that the cable will be damaged or that the connection will be severed inadvertently, such that there is a need to lead the cable from the buckle to the sensor unit in a secure fashion. Since the buckle is relatively far removed from the release module when it is arranged inside the main compartment of the backpack, the risk is particularly high as there are many potential areas where the connection could fail. Leading the cable from the buckle through the storage portion where the backpack is arranged has the advantage that said storage portion by definition has to extend almost from the buckle into the main compartment of the backpack where the cartridge that releases gas into the airbag is arranged. Therefore, a relatively protected space already exists that can be used for also guiding the cable securely.

It is noted, that the cable may be arranged inside the storage portion in such a manner, that it does not interfere with inflation of the airbag. Optionally, there may be positioning elements that aid in holding the cable in place.

The buckle of the chest strap and/or the buckle of the hip strap may comprise a magnet and may be configured such that the magnet aids in closing the buckle. The one or both of the shoulder straps and/or hip strap may have a widened, particularly a flap-shaped, portion that is configured to at least partially shield the user from a magnetic field of the magnet.

Alternatively or in addition the buckle of the chest strap and/or the buckle of the hip strap may have indicators, for example LEDs, indicating whether the release module is activated and/or whether a gas cartridge is correctly connected with the airbag and/or whether the gas cartridge is empty and/or indicating a battery state of the release module.

Using a magnetic buckle has the advantage of automatically guiding the user towards closing the buckle and also securing the buckle even more against inadvertent opening. Thereby the reliability of the activation of the release module is increased.

One or both of the shoulder straps and/or the hip strap having a widened portion that is configured to at least partially shield the user from the magnetic field of the magnet has the advantage, that the risk of the magnet interfering with electronics used by the user wearing the backpack, in particular a pace maker, is reduced.

Furthermore, when the widened portion of one or both of the shoulder straps is formed in a flap-shaped manner, it also aids in guiding the portion of the airbag that protects the breast of the user upon inflation, thereby improving the reliability of the protection even further.

The backpack may have a, particularly removable, protector plate for protecting the user's back, and the backpack may have a notebook compartment suitable for storing a notebook or tablet computer or other flat oblong object, wherein the notebook compartment may be arranged between the protector plate and the release module, in particular, between the back panel and the protector plate. This not only allows for better usage of storage space, but also allows for avoiding leverage effects that would arise with the release module being stored between the protector and the notebook or other flat oblong object.

The invention also relates to an airbag configured for use in a backpack, particularly a backpack as described above. The airbag is configured to, upon gas being automatically released into the airbag in response to a fall of the user of the backpack being detected, inflated so as to protect a cervical spine and/or chest region and/or shoulder region of the user wearing the backpack.

The airbag may be made from double weave, for example comprising two plies of woven material, wherein the plies are interwoven at outer edges of the airbag. In particular, the airbag may comprise a plurality of interwoven sections arranged and configured so as to bend at least part of the airbag into shape upon inflation of the airbag, particularly so as to wrap around a cervical spine region, for example a neck region, and/or the chest region and/or the shoulder region upon inflation.

The invention also provides a method for protecting a cervical spine and/or a chest region and/or shoulder region of a user by means of an airbag that, in a standby position, is stowed in the backpack, in particular using one of the backpacks described above. The method comprises automatically detecting a fall of the user of the backpack and, in response to detecting the fall of the user, automatically inflating the airbag by releasing gas from a gas cartridge into the airbag.

The method may further comprise a step of activating a release module that is configured to detect the fall of the user and release gas from the gas cartridge into the airbag when a buckle of a chest strap and/or a buckle of hip strap of the backpack is closed. Alternatively or in addition, the method may comprise a step of deactivating the release module when a buckle of a chest strap and/or a buckle of the hip strap of the backpack is opened.

It is noted that the features and advantages described above in the context of the backpack similarly apply to the above described airbag and to the above described method analogously.

Further features and embodiments and additional advantages are described below making reference to the enclosed figures.

BRIEF DESCRIPTION OF THE DRAWINGS

In the enclosed figures.

DETAILED DESCRIPTION

Figure 1:
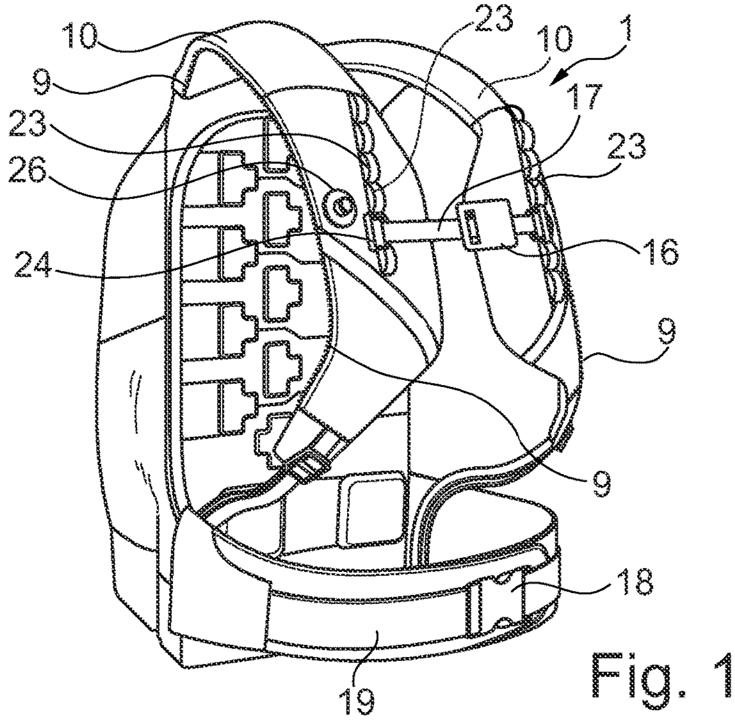
FIG. 1 is a schematic, not to scale illustration of an oblique view of a backpack.
Figure 2:
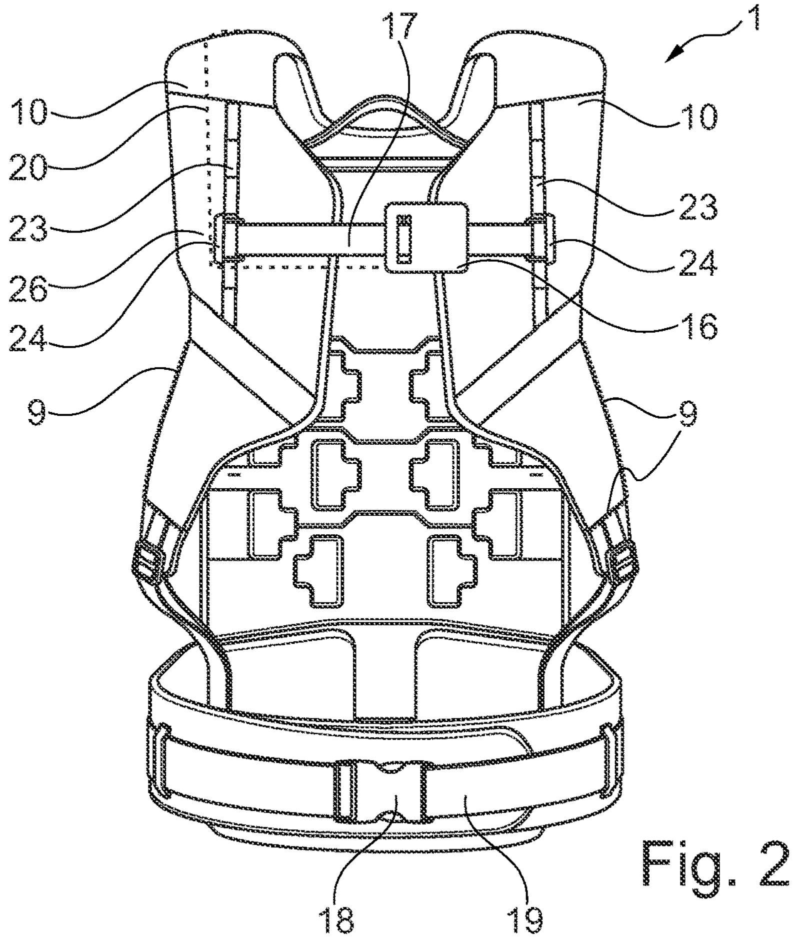
FIG. 2 is a schematic, not to scale illustration of back view of the backpack.
Figure 3A:
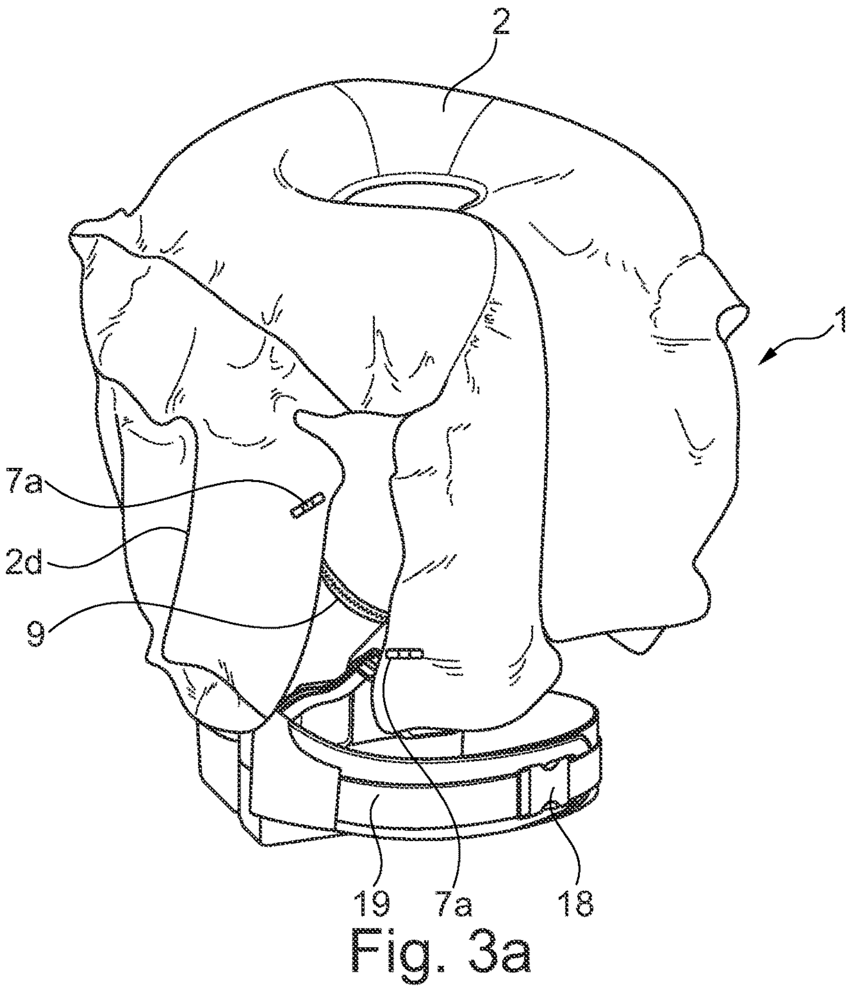
FIGS. 3*a* to 3*c* are schematic, not to scale illustrations of the backpack when the airbag is in an inflated state.
Figure 3B:
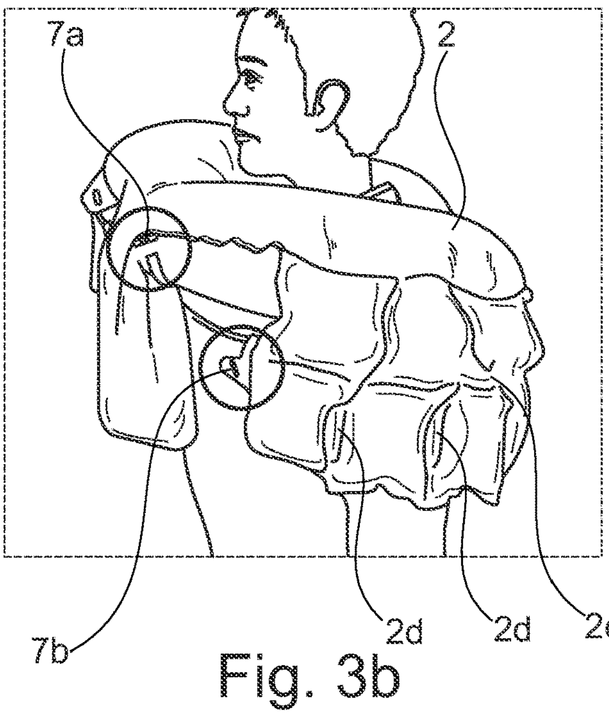
Figure 3C:
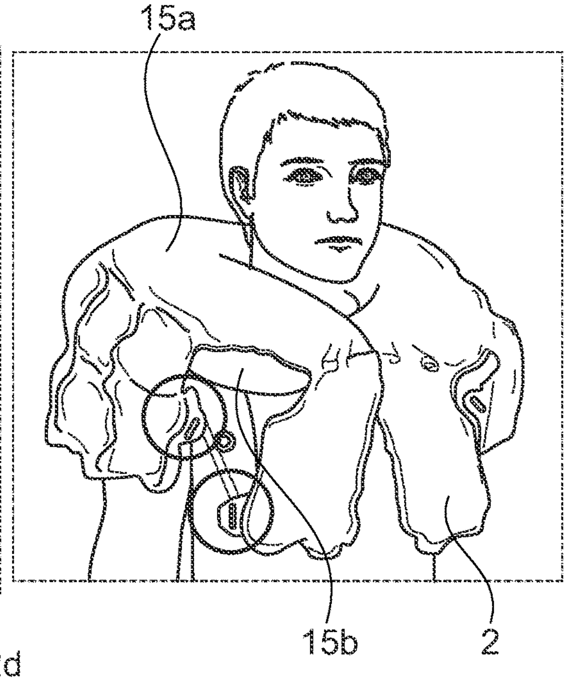
Figure 4A:
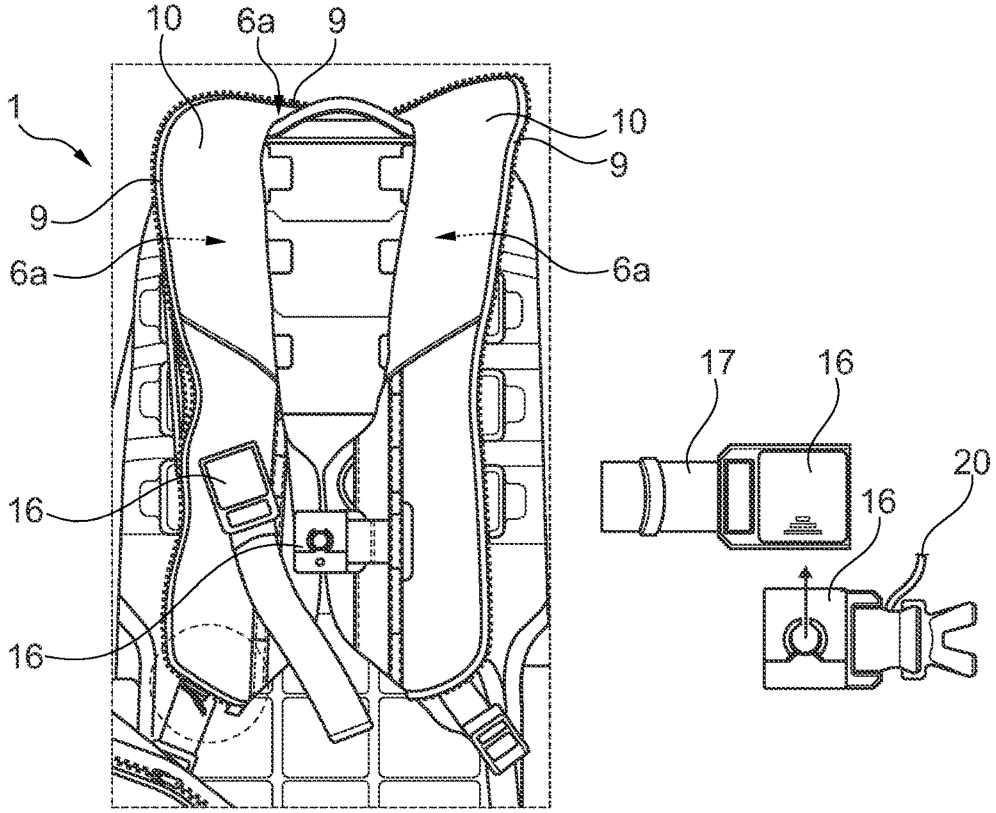
FIGS. 4*a* to 4*c* are schematic, not to scale illustrations of at least part of the back side of the backpack in partially disassembled states and a detailed view of a buckle.
Figure 4B:
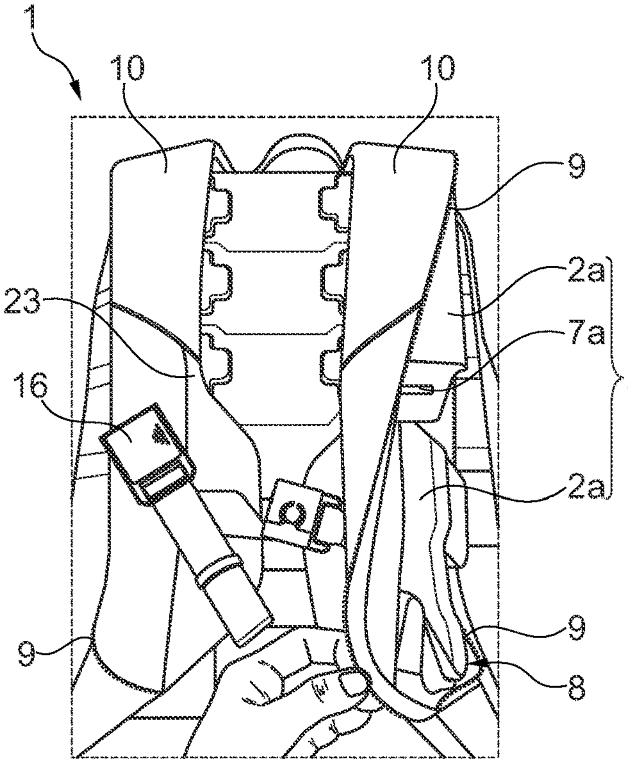
Figure 4C:
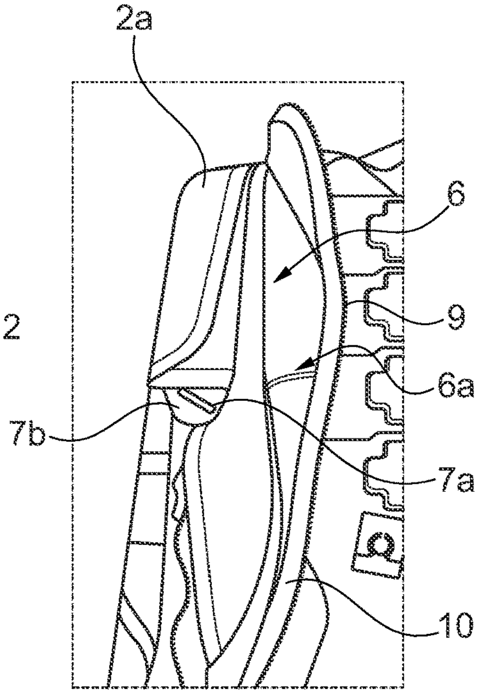
Figures 5A, 5B, 5C:
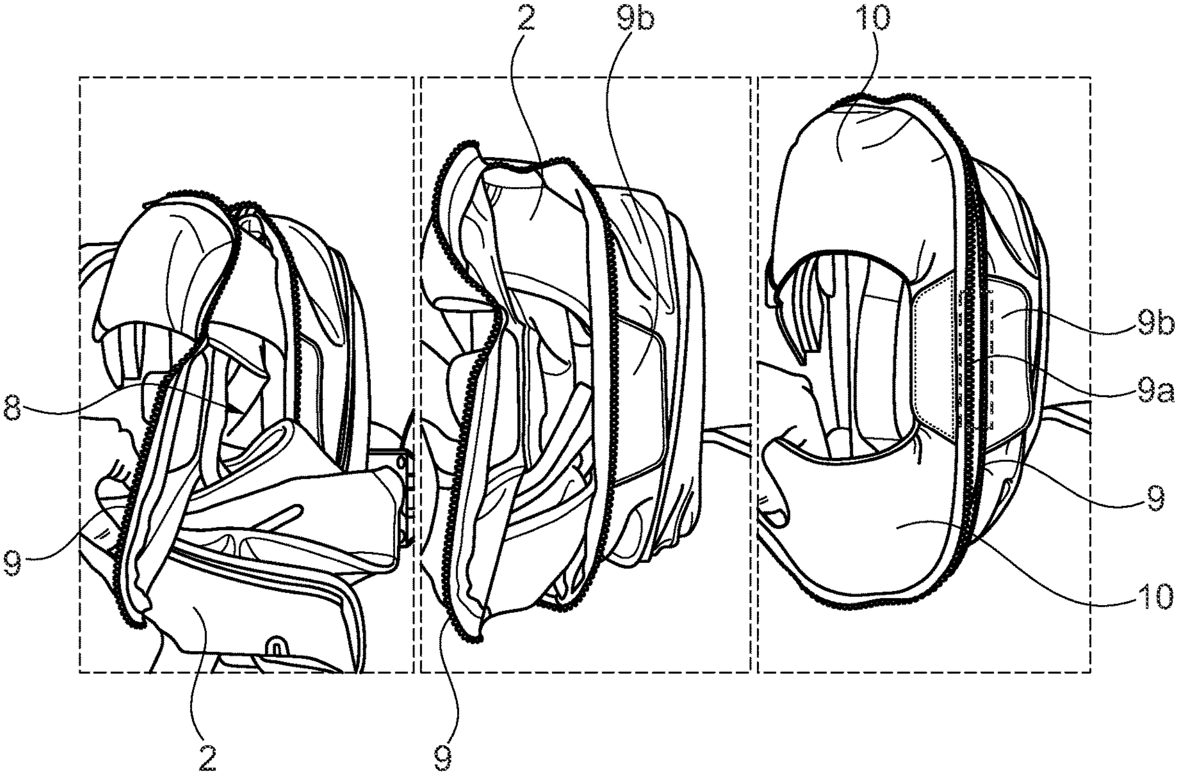
FIGS. 5*a* to 5*c* are schematic, not to scale illustrations of a top view of the backpack showing part of the storage space.
Figures 6A, 6B, 6C:
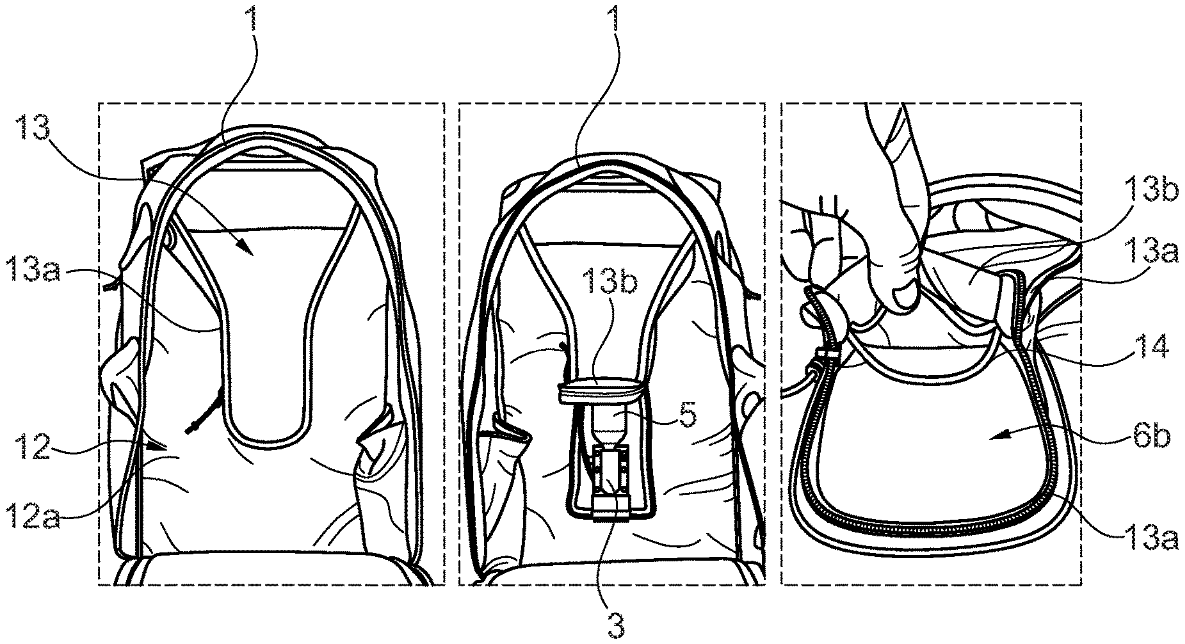
FIGS. 6*a* to 6*c* are schematic, not to scale illustrations of a main compartment and an inner compartment.

FIGS. 1 to 8 illustrate different schematic, not to scale views of a backpack 1 and its components.

Not all of the elements that are part of the backpack are visible in all of the views illustrated in the figures. However, it is to be understood that they are nonetheless present, although not visible. Furthermore, it is to be understood that in the following a preferred embodiment is disclosed and the invention is not limited to the features in the combination shown below. That is, several of the features may be optional, in particular, may be omitted or replaced with other features as long as they still fall within the scope of the invention.

FIGS. 1 to 8 show a backpack 1, having an airbag 2, and a release module 3. The release module comprises a control unit 4 and gas cartridge 5. The gas cartridge may be arranged in an upright orientation, particularly with a portion that is connected to the airbag being arranged at the lower end of the gas cartridge. In the present example, the gas cartridge is arranged centrally, but it may alternatively also be arranged closer to one of the side panels of the main compartment.

The release module also comprises a sensor unit 11, which may comprise an acceleration sensor 11*a*, a gyroscope 11*b*, a magnetometer 11*c*, and a barometer 11*d*. Backpack also has a storage space 6, different portions of which are visible in some of the figures. In this example, a first airbag portion 2*a*, which is released from the storage space upon inflation, is stowed in a first portion 6*a* of the storage space and a second airbag portion 2*b* is stowed in a second portion 6*b* of the storage space.

The backpack further comprises fixing means 7*a* and 7*b*, that cooperate so as to releasably fix the airbag to the storage space. In this example, the fixing means comprise toggles 7*a* and button holes 7*b* that cooperate with the toggles. As an example, the airbag may have several, in this example eight, button holes, which in this example are provided along the first airbag portion 2*a*. The backpack may comprise several, in this example eight, toggles provided inside the storage space, in particular distributed along the length of the first portion 6*a* of the storage space.

Other fixing means may be used and the number of fixing means may be different. Moreover, it is also possible to omit fixing means altogether.

As illustrated in the figures, the storage space has an opening 8 through which the first airbag portion extends upon inflation of the airbag. Furthermore, the figures show closing means 9, in this case in the form of a zipper, specifically a single zipper in this example, the zipper being configured to close the opening of the storage space. In the present case, the first portion of the storage space 6*a* extends along the shoulder straps 10 of the backpack.

At the top of the backpack, in a central position vertically above the release module, a burst section 9*a* of the zipper is provided. The burst section in this example is covered by means of piece of cover material 9*b*, e.g., a flap that may be secured, for example, using a velcro fastener.

The storage space 6 in the present example has a second portion 6*b* that is arranged inside the main compartment 12 of the backpack, more specifically in an inner compartment 13 within the main compartment. The inner compartment can be closed off from the main compartment by closing means 13*a*, e.g., a zipper, fastening a fabric panel 13*b*.

Retaining means 14 may be provided inside the inner compartment, for example in the form of a sleeve as shown in the figures, so as to stabilize the release module, particularly the gas cartridge, in an upright orientation and/or limit upward motion of the release module.

In the present embodiment, the airbag may be arranged inside the inner compartment and adjacent to a back panel 12*a* of the main compartment.

Figure 7A:
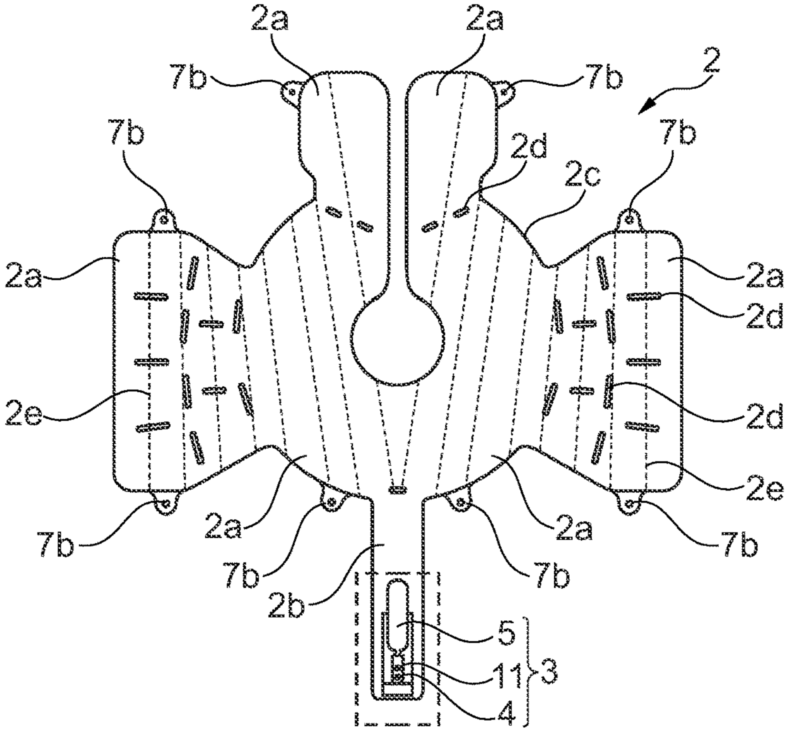
FIGS. 7*a* and 7*b* are schematic, not to scale illustrations of an airbag and release module removed from the storage space, wherein, in FIG. 7*b* some elements are omitted for simplicity and a cable, a chest strap, and a buckle are shown for illustrative purposes.

A detailed view of the airbag is shown in FIG. 7*a*, where it can be seen that the airbag is made from a double weave, for example comprising two plies 15*a* and 15*b* that are interwoven at the outer edges 2*c* of the airbag. Moreover, as also shown in FIG. 7*a*, the airbag may comprise interwoven sections 2*d*.

As can be seen in some of the figures, there are several interwoven sections that extend vertically and several interwoven sections that extend horizontally. As explained above, this ensures that a proper three-dimensional shape is obtained when the airbag inflates.

Figure 7B:
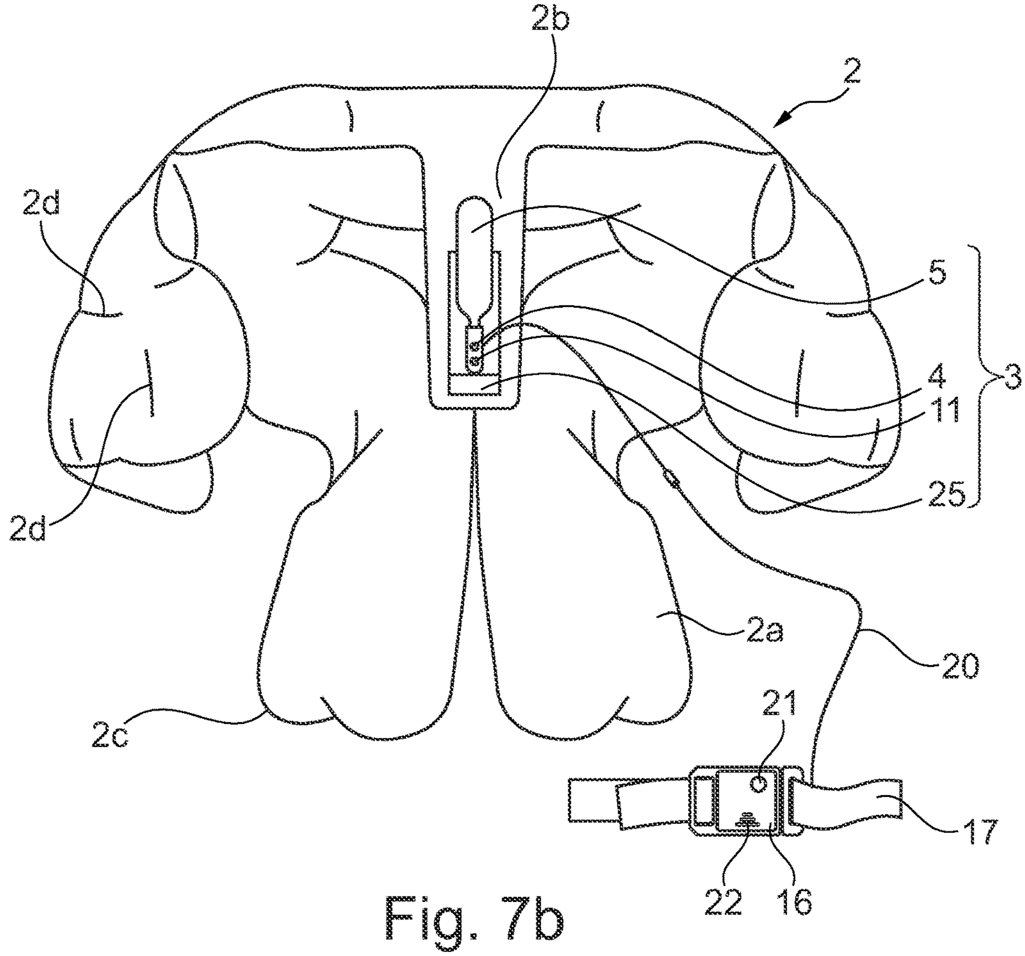
Figure 8:
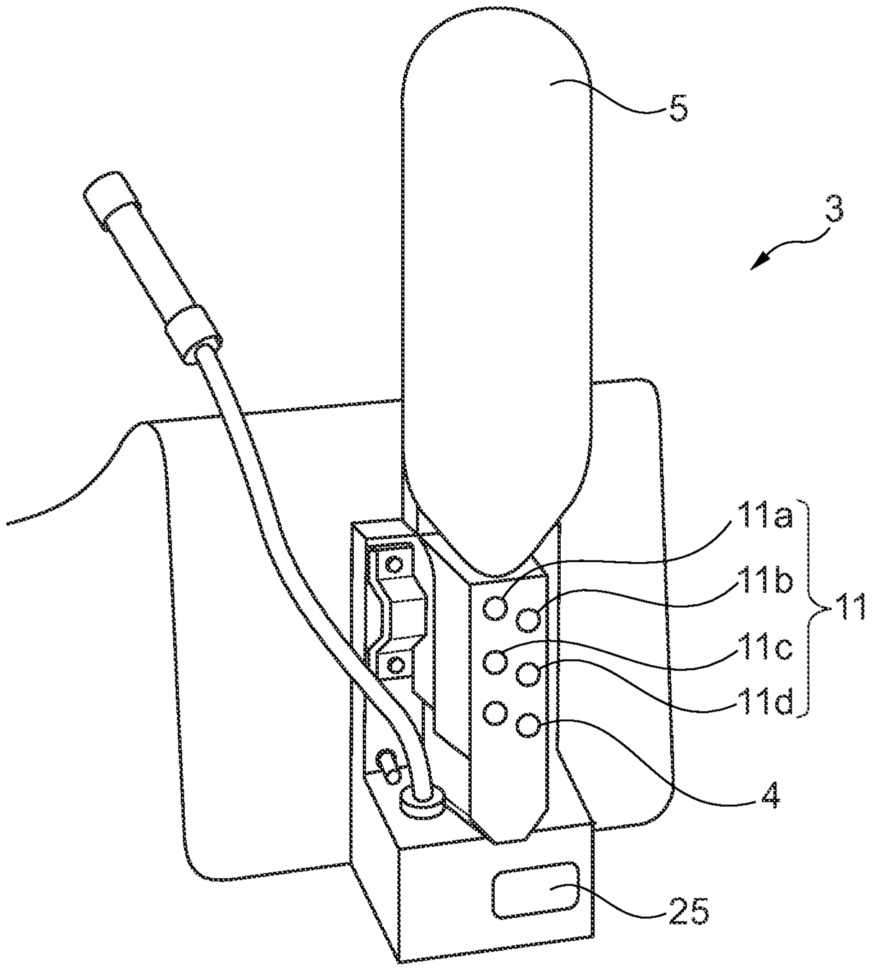
FIG. 8 is a schematic, not to scale illustration of a release module.

For example, as shown in FIG. 7*b*, in an inflated state, the airbag takes a three-dimensional shape that resembles several adjacent cushions.

The backpack comprises a buckle 16 of chest strap 17, and a buckle 18 of hip strap 19. A cable 20 may connect at least one of the buckles, in this particular case the buckle 16 of the chest strap, with the release module. As indicated in the figures, the cable 20 may run through the storage space from the buckle to the release module, i.e. it may be accommodated in the storage space together with the airbag in a standby position.

As schematically indicated by means of a circle, at least buckle 16 of the chest strap comprises a magnet 21 that aids in closing the buckle. Moreover, at least buckle 16 of the chest strap comprises an indicator 22, for example comprising LEDs, which is configured to be a status indicator for the status of the release module. Buckle 18 optionally may also comprise a magnet and/or an indicator. However, in the present example it is shown without these elements and is shown as a side-release buckle without magnets or indicators.

It is noted that the backpack may comprise a USB charging port 25 for charging a battery of the release module. The charging port in this embodiment is shown as being located adjacent to the control unit, but other arrangements can be envisioned.

In order to obtain proper protection for the user, the position of the chest strap relative to the shoulder straps may be adjustable. In the backpack as shown in the figures, this is achieved by a daisy chain system by which the chest strap can be fixed in various positions along the shoulder straps. To do so, loops 23 and fixing means 24, for example snap hooks, configured to cooperate with the loops may be provided.

The figures also illustrate how the airbag may be stowed in the storage portion and how the release module may be stored in the inner compartment 13 within the main compartment 12 of the backpack.

As can be seen in the figures, the second airbag portion 2*b*, the end of which is attached to the release module, is placed in the inner compartment within the main compartment of the backpack, while the main compartment and the inner compartment are open. In this example, the cartridge is inserted from below into a sleeve that opens at least downwardly.

The first airbag portion 2*a*, which is configured to inflate to protect the user, are arranged in a folded state inside part of the first portion 2*a* of the storage space, particularly at least in the shoulder straps 10 of the backpack and a part of the storage space extending between the upper ends of the shoulder straps and connecting the parts of the storage space in the shoulder straps.

When closing means 9 for closing the opening of the storage portion, is provided, as part of assembling the backpack, the closing means may be closed after placing the first airbag portion into the storage space.

Furthermore, as part of assembling the backpack, the above-mentioned closing means 13*a* may be closed so as to close off the inner compartment from the main compartment.

In case there is a cable 20 that runs from the buckle of the chest strap to the release module, upon inserting the airbag in the storage space, particularly in the storage space in the shoulder straps, the cable can be placed inside the storage space together with the airbag. If the airbag is fixed to the inside of the storage space, assembling the backpack, particularly stowing the airbag into the storage space, may also include fixing the airbag to the inside of the storage space using the fixing means 7*a* and 7*b* described above.

In the following, an embodiment of an airbag for use in a backpack will be described making reference to FIGS. 7*a* and 7*b*. Some of the features of the airbag 2 described above may similarly apply to the airbag of this embodiment. The airbag is configured to, upon gas being automatically released into the airbag in response to a fall of the user of the backpack being detected, inflate so as to protect a cervical spine, a chest region, and/or a shoulder region of the user wearing the backpack. In the embodiment illustrated in FIGS. 7*a* and 7*b*, due to the configuration of the airbag, all three regions are protected. The airbag may be for use in a backpack as described above or any other suitable backpack.

In the following, an embodiment of a method will be described, in some cases making reference to the backpack and airbag as illustrated in the figures, for ease of understanding and to better illustrate the method. However, it is noted that the method can also be carried out with any other suitable backpack.

The method according to the present invention includes the step of protecting the cervical spine, chest region, or shoulder region or a combination thereof by means of an airbag, for example the airbag described above, which is stowed in a backpack, for example a backpack as described above, in a standby position. The method comprises the step of automatically detecting a fall of the user of the backpack and, in response to detecting the fall of the user, automatically inflating the airbag by releasing gas from a gas cartridge, for example gas cartridge 5 mentioned above, into the airbag.

The method may comprise the step of activating a release module, for example release module 3 shown in the figures and described above, that is configured to detect the fall of the user and release gas from the gas cartridge into the airbag when a buckle, for example buckle 16 of a chest strap 17 or buckle 18 of a hip strap 19, is closed. Alternatively or in addition, the method may also comprise the step of deactivating the release module when the respective buckle is opened.

More specifically, the user may put on the backpack and close one of the buckles 16 or 18. The buckle may sense whether it is opened or closed and communicate this information to the release module, thereby activating the release module when the buckle is closed and/or deactivating the release module when the buckle is open. When the release module is activated, a processing unit, for example processing unit 4 described above, monitors data from which it can detect a fall of the user. For example, the data that is used for detecting the fall of the user may be obtained by a sensor unit, for example sensor unit 11 described above. When a fall of the user is detected, the processing units triggers release of gas from the gas cartridge into the airbag. This can be achieved, for example, by automatically triggering a punch that opens the fluidic connection between the gas cartridge and the airbag through which gas is released into the airbag. When gas is released into the airbag, the airbag inflates and extends, for example through the opening of the storage space, outside of the storage space so as to protecting a cervical spine and/or a chest region and/or a shoulder region of the user.

The method may optionally comprise deactivating the release module in response to the user opening the buckle of the chest strap and/or the hip strap, e.g., for taking off the backpack after use. When the release module is deactivated, the processing unit will not trigger release of gas from the gas cartridge into the airbag. In particular, deactivating the release module may comprise that the processing unit stops monitoring for a potential fall altogether. In addition, deactivating the release module may comprise deactivating one or more of the sensors of the sensing unit.

Optionally, the method may also comprise, upon closing the buckle that activates the release module, activating an indicator, for example including LEDs, indicating the state of the release module, for example the battery state and/or the presence and/or pressure of the gas cartridge and/or whether the release module is activated.

Optionally, the method may also comprise putting the buckle that activates and/or deactivates the release module in a parking position when the buckle is open, so as to avoid that the buckle inadvertently closes and activates the release module.

The activation and/or deactivation of the release module may also be performed in other ways, for example using an on/off button or any other type of suitable mechanism.

The airbag may optionally be reused after inflation. The method may optionally comprise exchanging the gas cartridge, for example after the airbag has been inflated.

Optionally, the method may also include assembly or disassembly of a backpack, e.g., a backpack as described above. This may include placing the release module and the first airbag portion into an inner compartment inside the main compartment of the backpack, and optionally closing off the inner compartment from the main compartment. It may also include placing, the second airbag portion in the storage space, in particularly in a folded manner, and optionally fixing the first airbag portion in the storage space. It may further include closing the opening of the storage space. Assembly may optionally comprise placing a cable, e.g., the above-mentioned cable 20, inside the storage space together with the airbag. For example, these steps may be performed as already described above in the context of the embodiment describing the backpack. Disassembly may be performed by reversing the steps performed for assembly.

While the invention has been illustrated and described in detail in the drawings and foregoing description, such illustration and description are to be considered exemplary and not restrictive. The invention is not limited to the disclosed embodiments. In view of the foregoing description and drawings it will be evident to a person skilled in the art that various modifications may be made within the scope of the invention, as defined by the claims.

The invention claimed is:

1. A backpack for fall protection comprising:

an airbag;

a release module, which comprises a control unit and a gas cartridge;

a storage space configured to receive and stow the airbag, in a standby state that is deflated; and wherein the airbag is automatically inflated, in response to the control unit detecting a fall of a user of the backpack, by releasing gas from the gas cartridge into the airbag to extend from the backpack to protect a cervical spine, a chest region, or a shoulder region of a user wearing the backpack, wherein inflation of at least a first airbag portion of the airbag releases the first airbag portion from the storage space, while remaining fixed to the inside of the storage space, wherein the backpack is configured such that, in the standby state, at least part of the first airbag portion is stowed in the storage space within shoulder straps of the backpack, and where the first airbag portion is fixed to the inside of the storage space using a plurality of fixing means, which are distributed along the length of a first storage portion of the storage space where the first airbag portion is stowed.

2. The backpack according to claim 1, wherein release module is configured to bring the airbag from the standby state to the inflated state within 0.5 seconds or less.

3. The backpack according to claim 1, wherein the first airbag portion is released from the storage space through an opening through which the first airbag portion extends upon inflation and further comprising at least one of a zipper, a hook-and-loop fastener, or snaps, and wherein the opening is at least partially closed by the at least one of a zipper, a hook-and-loop fastener, or snaps when the airbag is in the standby state.

4. The backpack according to claim 3, wherein the at least one of a zipper, a hook-and-loop fastener, or snaps is configured to be opened by the airbag pressing against the at least one of a zipper, a hook-and-loop fastener, or snaps upon inflation.

5. The backpack according to claim 4, wherein the at least one of a zipper, a hook and loop fastener, or snaps includes a burst section.

6. The backpack according to claim 5, wherein the burst section is arranged at a top of the backpack and centered between shoulder straps.

7. The backpack according to claim 3, wherein the opening of the storage space runs along a respective edge of the shoulder straps.

8. The backpack according to claim 1, wherein the release module comprises a sensor unit comprising one or more sensors, and wherein the control unit is configured to receive sensor data from the sensor unit and, based on the sensor data, detect a fall of the user.

9. The backpack according to claim 1, wherein the release module is removably stowed in an inner compartment inside of a main compartment.

10. The backpack according to claim 1, wherein, in the standby state, the airbag is inserted in the storage space in a fan-shaped folding shape.

11. The backpack according to claim 1, wherein the airbag is made from a double weave of a woven material interwoven at outer edges of the airbag, and configured to bend at least part of the airbag into shape upon inflation of the airbag to wrap around the cervical spine, the chest region, or the shoulder region upon inflation.

12. The backpack according to claim 1, further comprising a chest strap or a hip strap and wherein the release module is activated when a buckle of the chest strap or of the hip strap is in a closed state and deactivated when the buckle of the chest strap or the hip strap is in an opened state.

13. The backpack according to claim 12, wherein the buckle of the chest strap or the hip strap comprises a magnet and is configured to aid in closing the buckle.

14. The backpack according to claim 13, wherein one or both of the chest strap or the hip strap has a widened portion configured to at least partially shield the user from a magnetic field of the magnet, and wherein the buckle of the chest strap or the hip strap has indicators configured to indicate whether the release module is activated, whether a gas cartridge is correctly connected with the airbag, whether the gas cartridge is empty, or a battery state of the release module.

15. A method for protecting a cervical spine, a chest region, or a shoulder region of a user during a fall, the method comprising:

arranging the user in a backpack comprising:

an airbag;

a release module, which comprises a control unit and a gas cartridge;

a storage space configured to receive and stow the airbag, in a standby state that is deflated;

automatically detecting a fall of the user of the backpack;

in response to detecting the fall of the user, automatically inflating the airbag by releasing gas from the gas cartridge into the airbag, and where inflation of at least a first airbag portion of the airbag releases the first airbag portion from the storage space, while remaining fixed to the inside of the storage space, wherein, in the standby state, at least part of the first airbag portion is stowed in the storage space within shoulder straps of the backpack; and wherein the first airbag portion is fixed to the inside of the storage space using a plurality of fixing means, which are distributed along the length of a first storage portion of the storage space where the first airbag portion is stowed.

16. The method of claim 15 further comprising:

when a buckle of a chest strap or a buckle of a hip strap is closed, activating a release module that is configured to detect the fall of the user and release gas from the gas cartridge into the airbag; or when the buckle of the chest strap or the buckle of the hip strap is opened, deactivating the release module that is configured to detect the fall of the user.

* * * * *